May 22, 1928.　　　　　　　　　　　　　　　1,670,636
A. E. SCHEIN
BEARING
Filed March 31, 1924
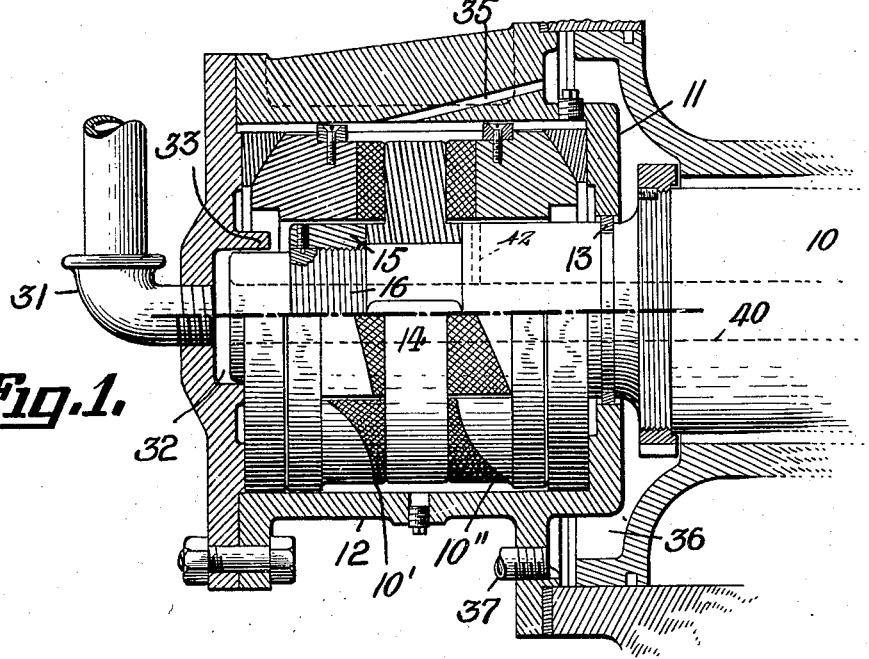
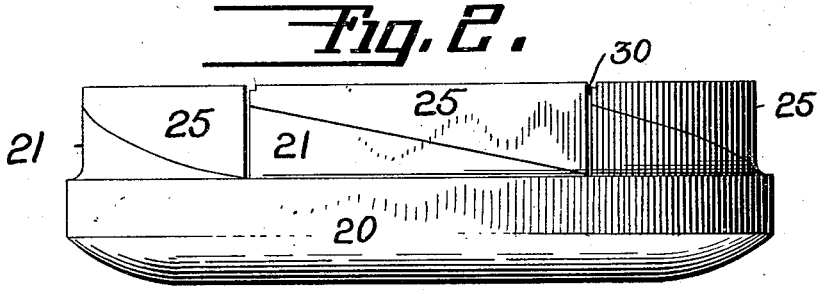
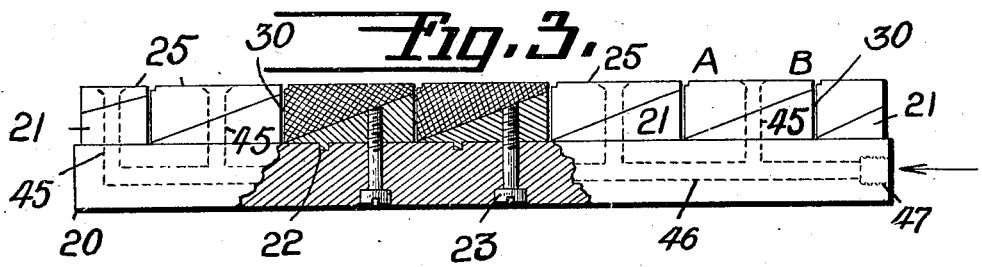
Inventor
ALEXANDER E. SCHEIN.
By his Attorney
Herbert H. Thompson Patented May 22, 1928.

1,670,636

UNITED STATES PATENT OFFICE.

ALEXANDER E. SCHEIN, OF NEW YORK, N. Y., ASSIGNOR TO THE SPERRY GYROSCOPE COMPANY.

BEARING.

Application filed March 31, 1924. Serial No. 703,009.

This invention relates to the so-called plain bearings as distinguished from roller and ball bearings, and although the invention is herein illustrated in connection with a thrust bearing, it should be understood that it applies equally as well to radial bearings. It has now been worked out and is well understood that in order to obtain the best results in bearing lubrication, an oil film of appreciable thickness, as distinguished from wetted surfaces, must be built up and maintained by the movement of the shaft between the shaft and bearing. In ordinary bearings, in which the load is in the same direction at all times, this is accomplished more or less automatically by giving the bearing a slight clearance. The shaft in rotating tends to be displaced in the direction of rotation and thereby provides a slightly thicker oil film on the "on" side of the bearing than on the "off" side. This builds up and maintains an oil film which completely separates the shaft from the bearing. In the ordinary thrust bearing no such action takes place, and the oil is found to be rubbed out between the flat surfaces so that no oil film is maintained. One method of overcoming this is to make a slight angle between the two bearing surfaces so that the oil film is thicker on the "on" side than on the "off" side of the bearing. I am aware that it has been proposed to accomplish this result by means of a series of pivoted blocks or by beveling off the edges of blocks which have a cut-out or weakened portion underneath the bevel. It has also been proposed to obtain this result by the employment of bearing blocks without rigid support upon a base at their leading edges.
I find, however, that this complication is entirely unnecessary and that desirable results may be secured by a plain bearing of which substantially the whole of the bearing material is supported by the base when constructed according to my invention.

The bearings are naturally called upon to operate under wide limits of temperature. This invention provides the best arrangement under these conditions, that is, where the temperature coefficient throughout the entire thrust plate, including the base and the bearing material, is the same.

A further object of my invention is to provide means in the thrust bearings where the shaft operates under a heavy initial load for relieving the bearing of said initial load.

Other objects of my invention will become more apparent as the description thereof proceeds.

In the accompanying drawings,

Fig. 1 is a vertical section through a thrust bearing embodying my invention and applied to a propeller shaft.

Fig. 2 is an enlarged detail in front elevation of one form of my novel thrust bearing plate.

Fig. 3 is a front elevation partly sectioned showing a slightly modified form of thrust bearing plate and embodying means for relieving said plate of the initial load.

In order to carry out my invention, I employ as a lining for the bearing a special Babbitt or other substance which elastically deforms easily, or in other words, which has a low modulus of elasticity. The relation between these factors is shown by the equation, $$D = \frac{P \times T}{C}$$

Where $D$ = Deformation.
$P$ = Load per unit area.
$T$ = Thickness of the metal.
$C$ = Modulus of elasticity.

Therefore, in selecting a Babbitt or other metal for my improved bearing, I employ a substance having a low modulus of elasticity as the first requirement, rather than a low co-efficient of friction and also of course requisite softness to prevent damage to the shaft in case of the bearing running dry. With such material I so proportion the thickness of the bearing employed at each point that a thicker oil film will be built up and maintained on the "on" side than on the "off" side of the bearing. A suitable babbitt for such purpose is a babbitt composed of approximately 83+% tin, 8+% antimony, 8+% copper, and .3+% lead. The above composition can be varied widely as long as the above stated requirements are met.

Referring to Fig. 1, I have shown these principles embodied in a thrust bearing for propeller shafts. The shaft is shown at 10 extending through the front wall 11 of a casing 12 and sealing ring 13 being provided between said shaft and the opening in said front wall. The shaft 10 has provided thereon within casing 12, a thrust collar 14 held in position by a lock-nut 15 screwed upon a reduced end portion 16 of said shaft. Said thrust collar 14 is adapted to bear upon a thrust bearing plate 10'—10" at each side thereof.

Referring to Fig. 3, the detailed construction of these bearing plates will become apparent. As shown, each bearing plate comprises a base 20 upon which are positioned a plurality of wedge shaped blocks 21 all similarly disposed, that is, with their inclined edges extending in the same direction. The said wedges 21 may be provided with tenons 22 lodged in suitable grooves in the base 20 to prevent displacement thereon and are further fixed in position by means of bolts 23 extending upwardly through the base plate 20 and through each of said wedge-shaped blocks 21. Upon said wedge-shaped blocks are positioned similar blocks 25 oppositely disposed so that the upper surfaces of said blocks 25 are in the same single plane.

It will be observed that by my design I secure a much greater thickness of babbitt at points such as A on the "on" side of the bearing than at points such as B on the "off" side. A much greater deflection of babbitt will be obtained at points such as A because the babbitt is much thicker at this point than further back, in accordance with the equation $$D = \frac{P \times T}{C}$$

and hence will not scrape off the oil at this point but will permit it to get between the bearings and the shaft, thereby building up a continuous oil film.

It is understood that when the propeller shaft 10 rotates in one direction, one of said bearings 10'—10" sustains the thrust while, when the propeller shaft rotates in the other direction, the other of said bearings 10'—10" takes up the thrust. It is, therefore, necessary that the babbitt blocks 25 and blocks 21 on the bearing 10 shall be oppositely disposed to the babbitt blocks 25 and blocks 21 on the bearing 10' as shown clearly in Fig. 1, so that the thin portions B of the babbitt blocks 25 on bearing 10 are opposite the thick portions A of the babbitt blocks 25 on the bearing 10'.

I have found, however, by many experiments that the selection of the material for the base 20 is quite as important as the selection of the babbitt and the design of the bearing in general. Many of the first bearings constructed proved failures on account of the fact that it had not then been discovered that the unequal expansion of the base and babbitt, due to temperature changes, destroyed or seriously hampered the proper functioning of the bearing by altering the proper clearances to maintain the proper oil film. It should be appreciated that we are dealing here with very small distances, namely, on the order of .0005 or less of an inch and that the whole theory of operation depends upon the accurate maintenance of the above described oil film relation. I have discovered that the only method by which this may be maintained is to select a material for the base 20 and blocks 21 which has substantially the same temperature coefficient of expansion as the babbitt forming the wedges 25. For this purpose I prefer brass, the proportions of copper and zinc being chosen to give the required expansion rate. For instance, with a babbitt of approximately the compostion given above, a brass having from 60 to 70 per cent of copper and 30 to 40 per cent zinc would be chosen.

In Fig. 2 I have shown the blocks 21 formed integral with the base 20, but this is a mere constructional difference with respect to the form shown in Fig. 3, the latter form being the easier to construct. In Fig. 2 there is, therefore, only two types of material whose temperature coefficients must be substantially the same, while in Fig. 3 there may be two or three types of material depending upon whether the material of blocks 21 is the same as that of base 20.

While both the blocks 21 and the blocks 25 may be constructed so that all of each set of blocks form one continuous integral member, I prefer to make each of the blocks of each set separate and individual so as to provide oil grooves 30 between adjacent blocks of the same set.

For circulating the lubricant I provide an oil inlet 31 adapted to supply oil under a predetermined pressure to the interior 32 of casing 12, said casing being provided on the inside thereof with a lip 33 above said inlet 31 to cause the oil to flow downwardly to the bottom of the casing 12 and thence upwardly to completely enclose said bearing and through overflow pipe 35 leading to an outlet passage 36 outside of said bearing casing to an outlet 37. The shaft 10 is provided with an axial bore 40 through which oil may pass and with radial bores 42 extending outwardly from said central bore 40.

For relieving the bearing of the initial load, a plurality of oil passages 45 may be provided extending upwardly through blocks 25 to the face thereof adjacent thrust collar 14, said passages 45 communicating with a main passage 46 which may be within block 20, said passage 46 communicating at its outer end 47 with a source of oil under relatively high pressure. Said passages 45 preferably extend upwardly through each babbit block 25 though the number of said passages 45 may be varied at will. Means are provided connected with each passage 47 whereby the supply of oil under pressure to bearing 10 or to bearing 10' may be controlled by the operator in accordance with the direction of rotation of shaft 10, and hence in accordance with which bearing is to carry the load. In starting, therefore, the operator would transmit oil under pressure to the proper bearing 10 or 10' to relieve said bearing wholly or partly of the initial load.

The oil passages 45 and 46 are not shown in Fig. 1 because, as hereinbefore stated, said shaft 10 has been described as a propeller shaft which, therefore, starts under zero load but in any other case where shaft 10 starts under an initial load, the oil pressure system shown in Fig. 3 may be employed.

In accordance with the provisions of the patent statutes I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A bearing comprising a supporting base, a plurality of sections on said base subject to the wedging action of the lubricant, said base and said sections being composed of metal having substantially the same temperature coefficient, and each section being composed of a metal having a much less modulus of elasticity than the base, said metal being thicker where the oil enters the bearing.

2. A bearing comprising a supporting base and a babbitted bearing surface thereon having a plurality of oil grooves therethrough, the babbitt of said surface and said supporting base having substantially the same temperature coefficient, and the thickness of the babbitt of said surface being greater by a predetermined amount where the oil enters between the same and its shaft and the elasticity of the babbitt being such as to provide by the compression of the babbitt a sufficient space for the entering oil film to maintain the film across said surface.

3. A bearing comprising a supporting base and bearing material of a much lower modulus of elasticity than the base, wherein the bearing material is composed of wedge-shaped blocks and supported upon similarly-shaped but oppositely disposed blocks fixed to said base so that the upper surfaces of said bearing material and blocks form a single plane, characterized by said base and said blocks having substantially the same temperature coefficient.

4. A thrust bearing comprising a stationary member, a plurality of circumferentially grouped stationary bearing shoes directly supported on said member and adapted to support a rotatable member, said shoes and stationary member having substantially the same temperature coefficient and said shoes being of a more easily compressible metal than the metal of said member, and each of said shoes being of graduated thickness so as to yield unequally under compression to present inclined surfaces.

In testimony whereof I have affixed my signature.

ALEXANDER E. SCHEIN.